United States Patent
Yang

(10) Patent No.: US 11,840,223 B2
(45) Date of Patent: Dec. 12, 2023

(54) DRIVER ASSISTANT SYSTEM AND METHOD OF CONTROLLING THE SAME

(71) Applicant: MANDO CORPORATION, Pyeongtaek-si (KR)

(72) Inventor: Junhyeok Yang, Seongnam-si (KR)

(73) Assignee: HL Klemove Corp., Incheon (KR)

(*) Notice: Subject to any disclaimer, the term of this patent is extended or adjusted under 35 U.S.C. 154(b) by 181 days.

(21) Appl. No.: 17/390,424

(22) Filed: Jul. 30, 2021

(65) Prior Publication Data
US 2022/0048499 A1   Feb. 17, 2022

(30) Foreign Application Priority Data

Aug. 14, 2020   (KR) .......................... 10-2020-0102537

(51) Int. Cl.
*B60W 30/09*   (2012.01)
*B60W 30/18*   (2012.01)
(Continued)

(52) U.S. Cl.
CPC ............ *B60W 30/09* (2013.01); *B60W 10/08* (2013.01); *B60W 10/20* (2013.01);
(Continued)

(58) Field of Classification Search
CPC ................ B60W 10/18; B60W 10/20; B60W 2050/143; B60W 2420/42;
(Continued)

(56) References Cited

U.S. PATENT DOCUMENTS 9,135,803 B1 *   9/2015   Fields .................... G08B 21/02
2008/0150786 A1 *   6/2008   Breed .................. B60N 2/2863
342/53

(Continued)

FOREIGN PATENT DOCUMENTS

KR   1998-048904 U   10/1998
KR   10-2017-0002166 A   1/2017

(Continued)

OTHER PUBLICATIONS

Office Action issued in corresponding Korean Patent Application No. 10-2020-0102537, dated Dec. 6, 2021.

*Primary Examiner* — Babar Sarwar
(74) *Attorney, Agent, or Firm* — Morgan, Lewis & Bockius LLP

(57) ABSTRACT

Provided is a driver assistance system including an internal camera installed in a vehicle to detect whether a driver is in a drowsy driving, and configured to photograph a state of eyes of the driver to acquire drowsiness data, a first sensor installed in the vehicle to have a front-side view of the vehicle, and configured to acquire first sensor data to detect an object in the front-side view, a second sensor installed in the vehicle to have a rear-side view of the vehicle and configured to acquire second sensor data to detect an object in the rear-side view, and a controller including at least one processor configured to process the drowsiness data, the first sensor data, and the second sensor data, wherein the controller is configured to: if a result of processing the drowsiness data is that the driver has closed the driver's eyes for a predetermined time or longer, transmit a control signal to at least one of a braking device or a steering device to perform a lane change for stopping the vehicle based on a result of processing the first sensor data and the second sensor data.

18 Claims, 9 Drawing Sheets

(51) Int. Cl.
  *B60W 10/18* (2012.01)
  *B60W 10/20* (2006.01)
  *B60W 50/14* (2020.01)
  *B60W 10/08* (2006.01)

(52) U.S. Cl.
  CPC ...... *B60W 30/18163* (2013.01); *B60W 50/14* (2013.01); *B60W 2420/42* (2013.01); *B60W 2420/52* (2013.01); *B60W 2510/202* (2013.01); *B60W 2540/18* (2013.01); *B60W 2540/229* (2020.02); *B60W 2554/20* (2020.02); *B60W 2554/801* (2020.02); *B60W 2554/802* (2020.02)

(58) Field of Classification Search
  CPC ....... B60W 2420/52; B60W 2510/202; B60W 2540/18; B60W 2540/229; B60W 2540/26; B60W 2554/20; B60W 2554/801; B60W 2554/802; B60W 30/09; B60W 30/18163; B60W 50/14; B60W 2040/0818; B60W 2050/0029; B60W 2050/007; B60W 2540/045; B60W 2552/00; B60W 2554/00; B60W 2555/20; B60W 2556/50; B60W 2710/20; B60W 30/182; B60W 40/09; B60W 60/0051; B60W 60/0053; B60W 60/0059; B60W 60/007; B60Y 2302/05; G06V 20/597; G05D 1/0011; G05D 1/008
  See application file for complete search history.

(56) References Cited

U.S. PATENT DOCUMENTS

| | | | |
|---|---|---|---|
| 2019/0111942 A1* | 4/2019 | Suzuki | B60W 10/20 |
| 2019/0184998 A1* | 6/2019 | Zheng | B60W 60/007 |
| 2019/0351918 A1* | 11/2019 | Maeng | H04W 4/44 |
| 2020/0247415 A1* | 8/2020 | Tsuji | G05D 1/0223 |
| 2020/0379460 A1* | 12/2020 | Stent | G06V 10/82 |
| 2021/0065401 A1* | 3/2021 | Chang | G06V 40/19 |
| 2021/0284194 A1* | 9/2021 | Kijima | B60W 50/038 |
| 2021/0403020 A1* | 12/2021 | Charugundla Gangadhar | B60W 40/105 |
| 2021/0405155 A1* | 12/2021 | Shand | G01S 17/10 |

FOREIGN PATENT DOCUMENTS

| | | |
|---|---|---|
| KR | 10-2018-0000420 A | 1/2018 |
| KR | 10-2019-0050633 A | 5/2019 |

* cited by examiner

[FIG. 1]
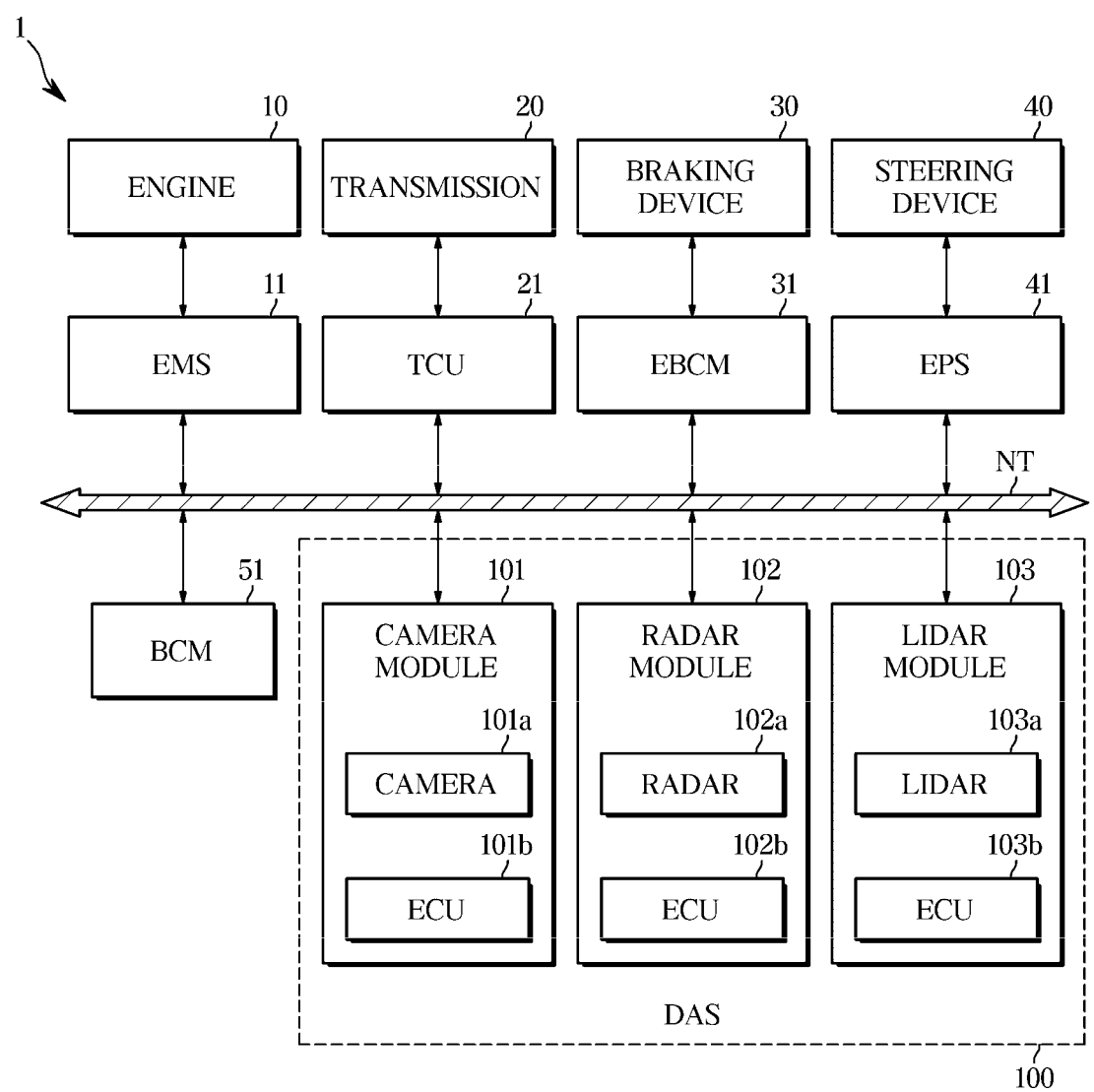

[FIG. 2]
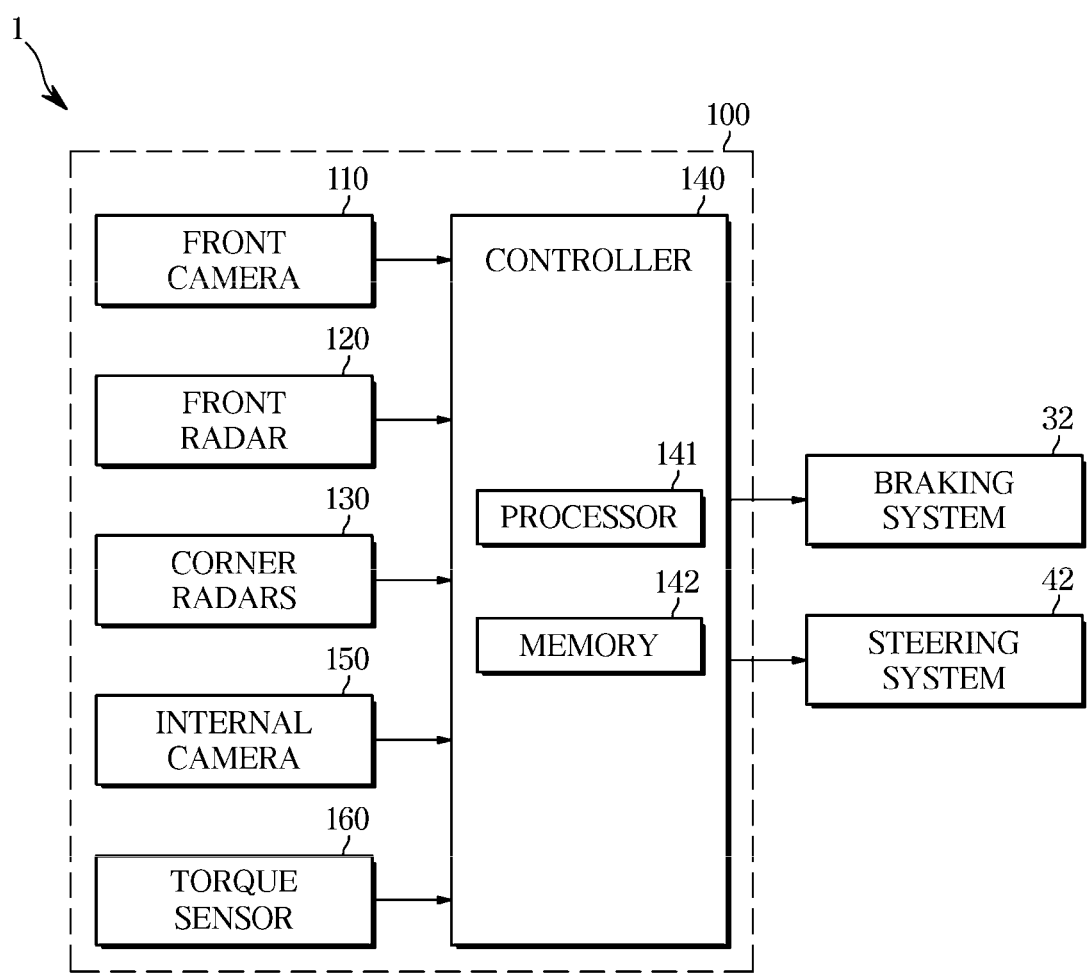

[FIG. 3]
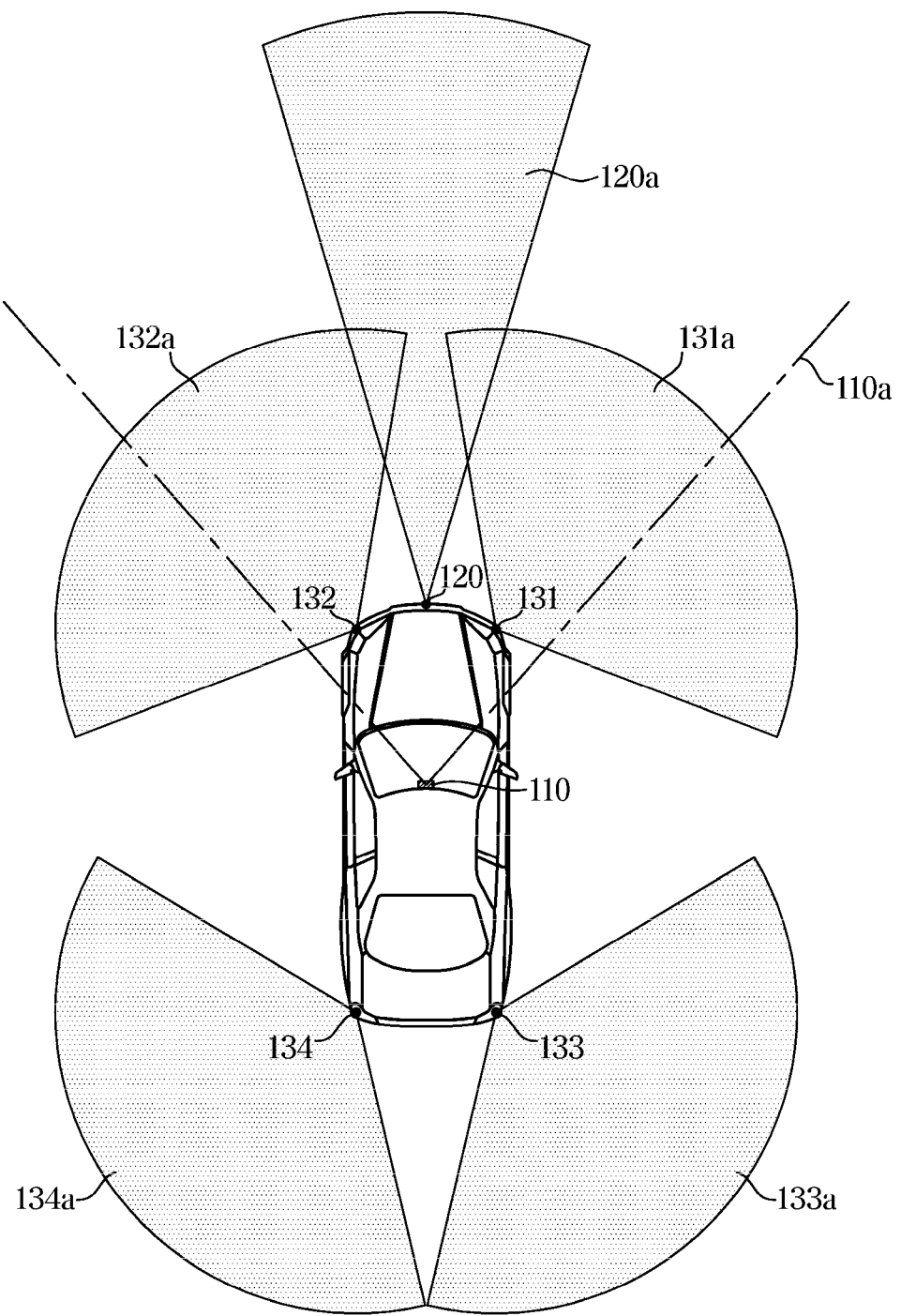

[FIG. 4]
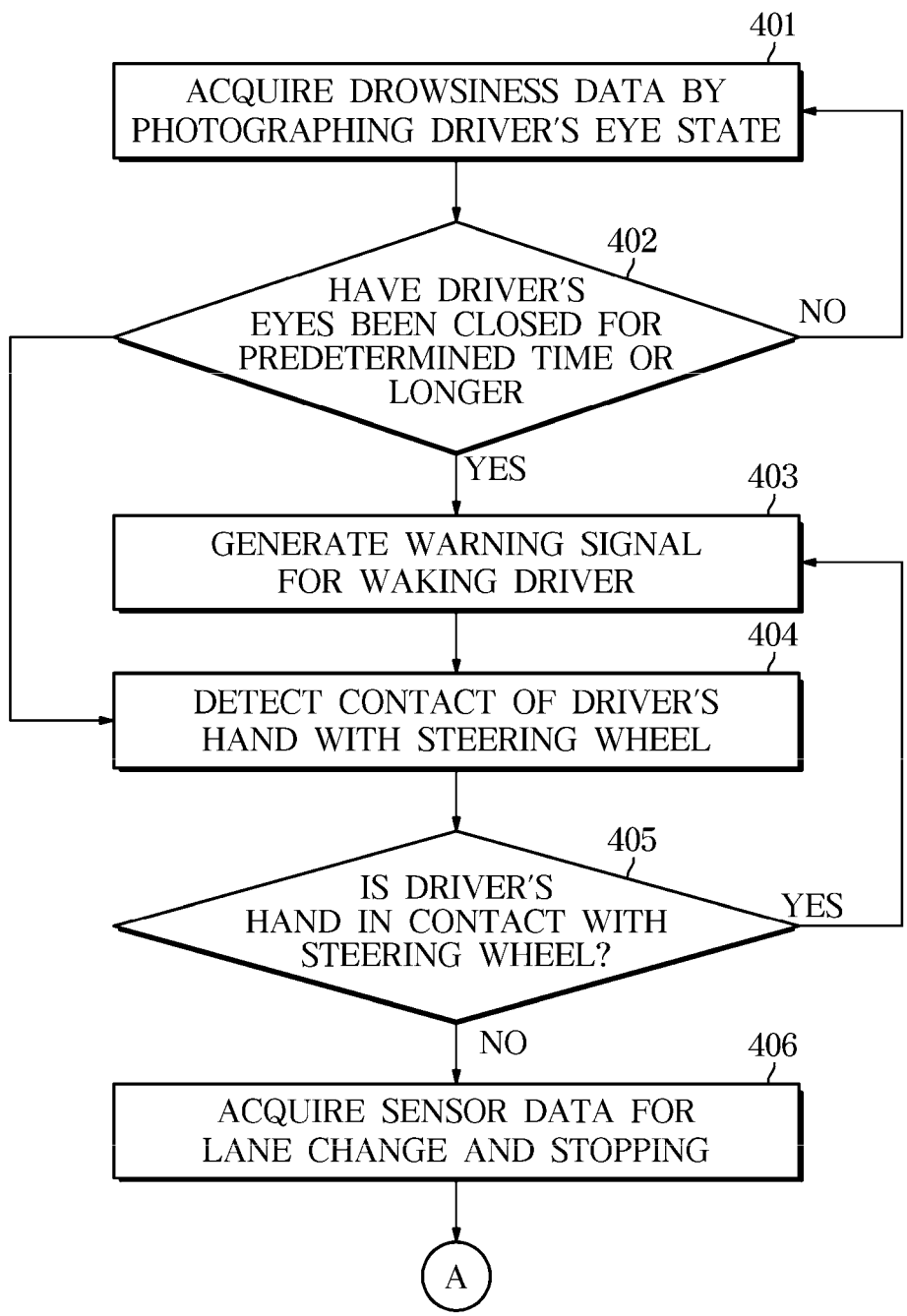

[FIG. 5]
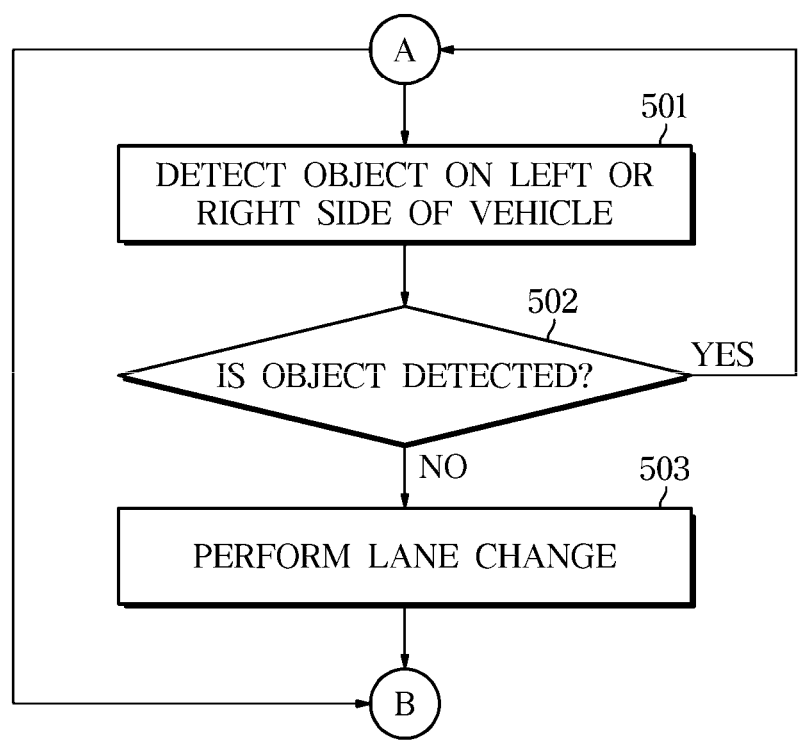

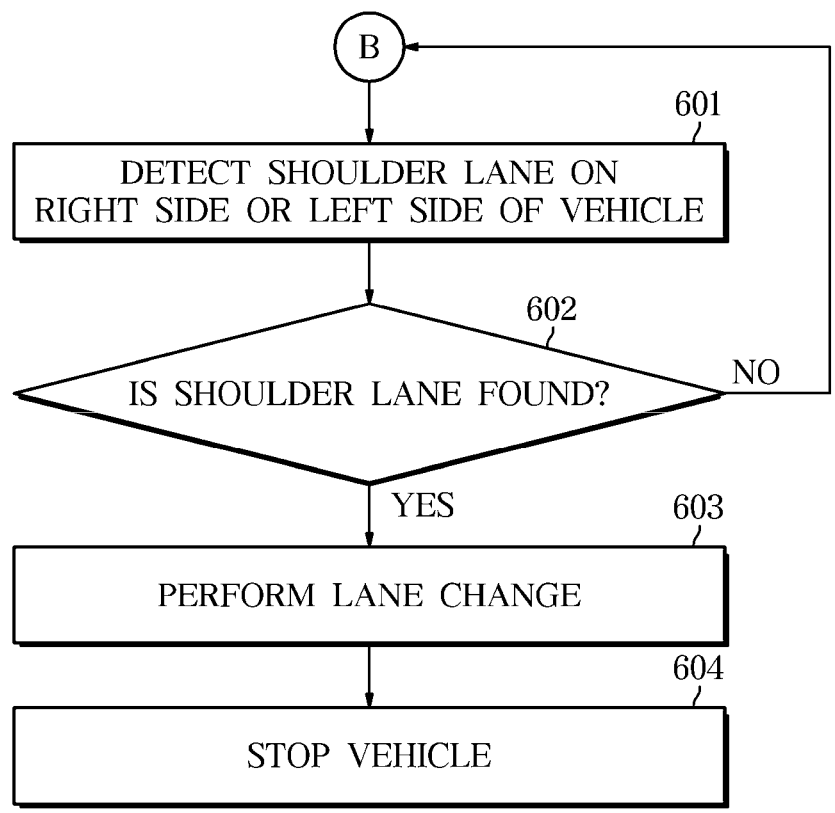
[FIG. 6]

[FIG. 7]
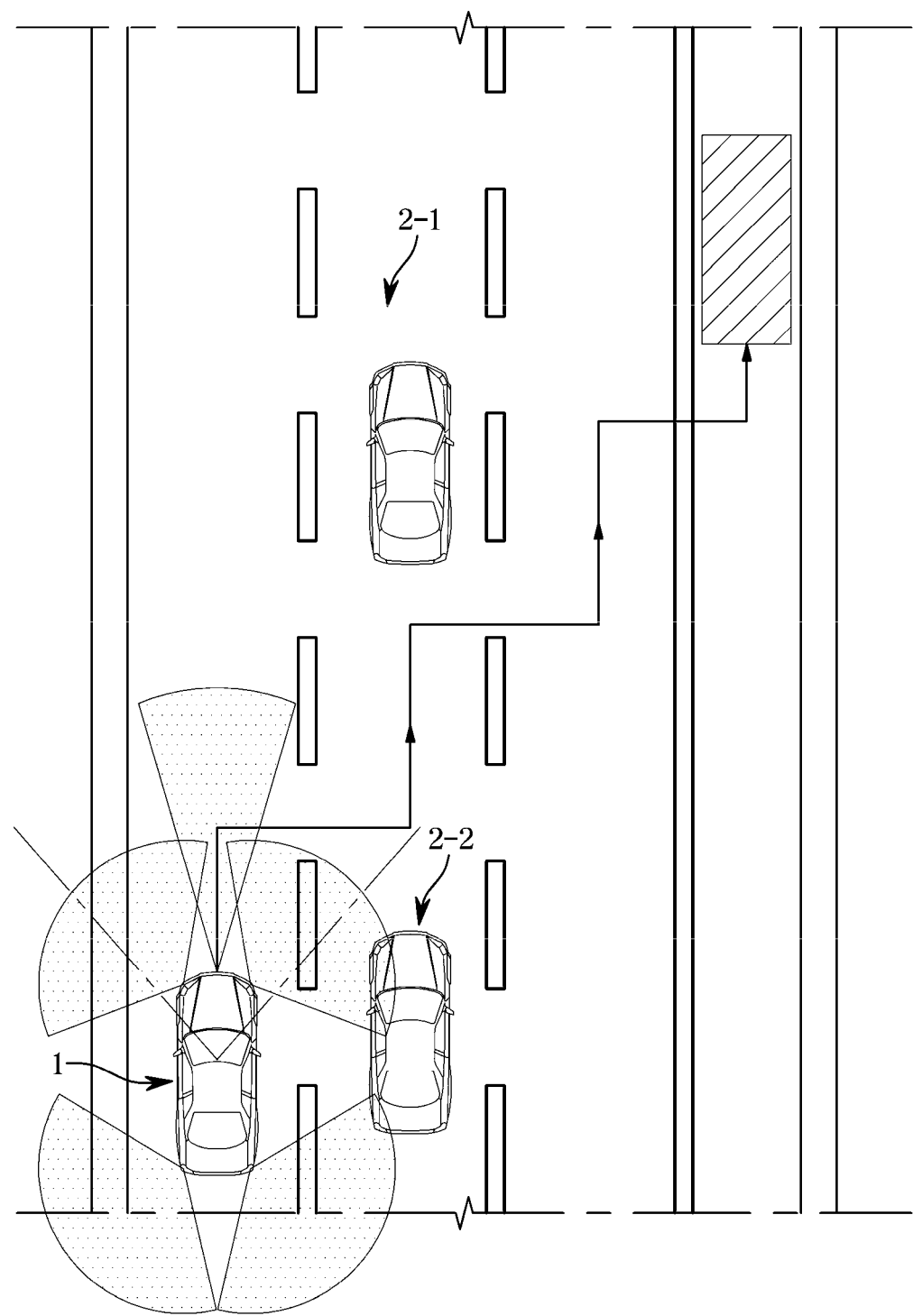

[FIG. 8]
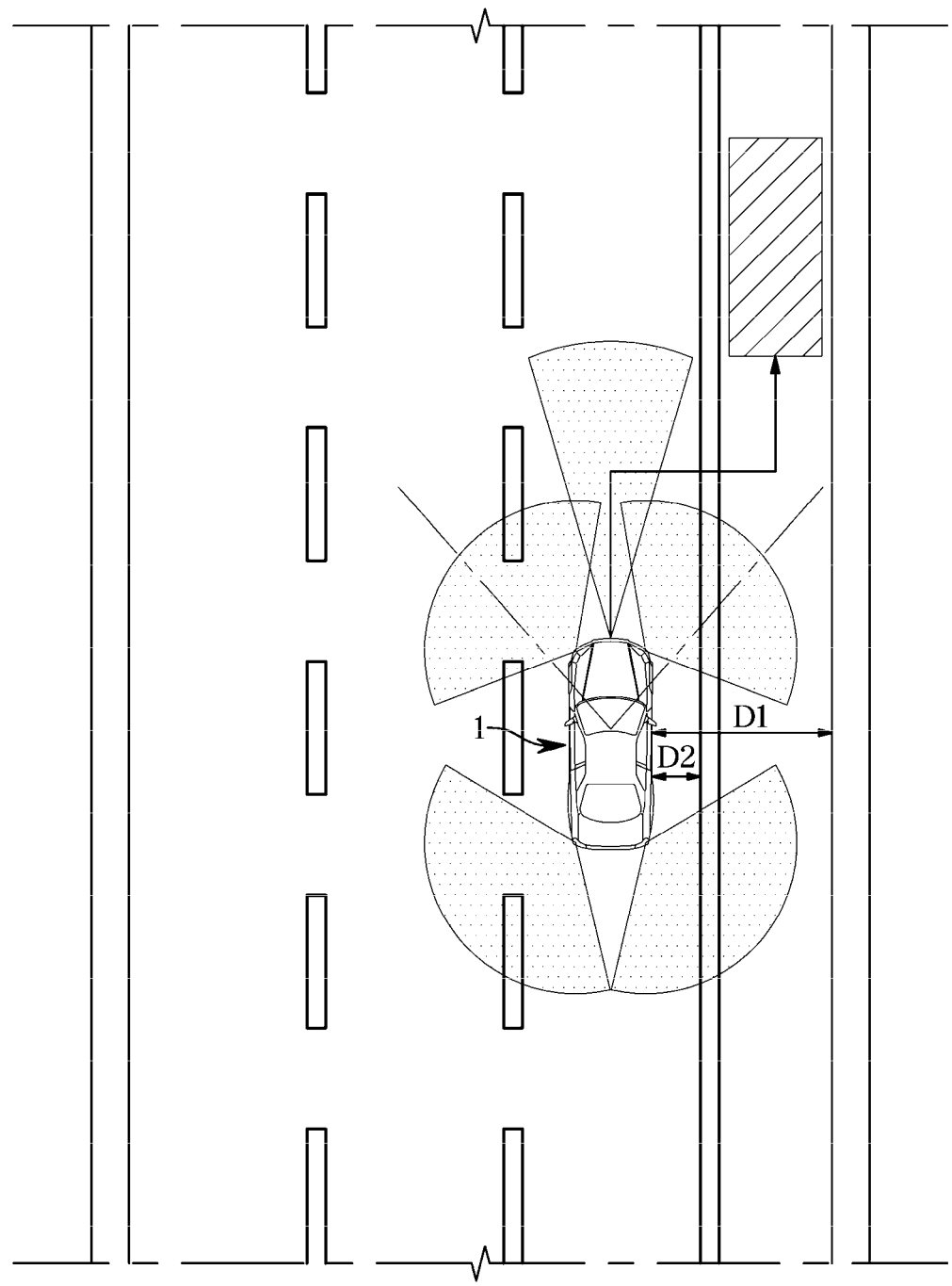

[FIG. 9]
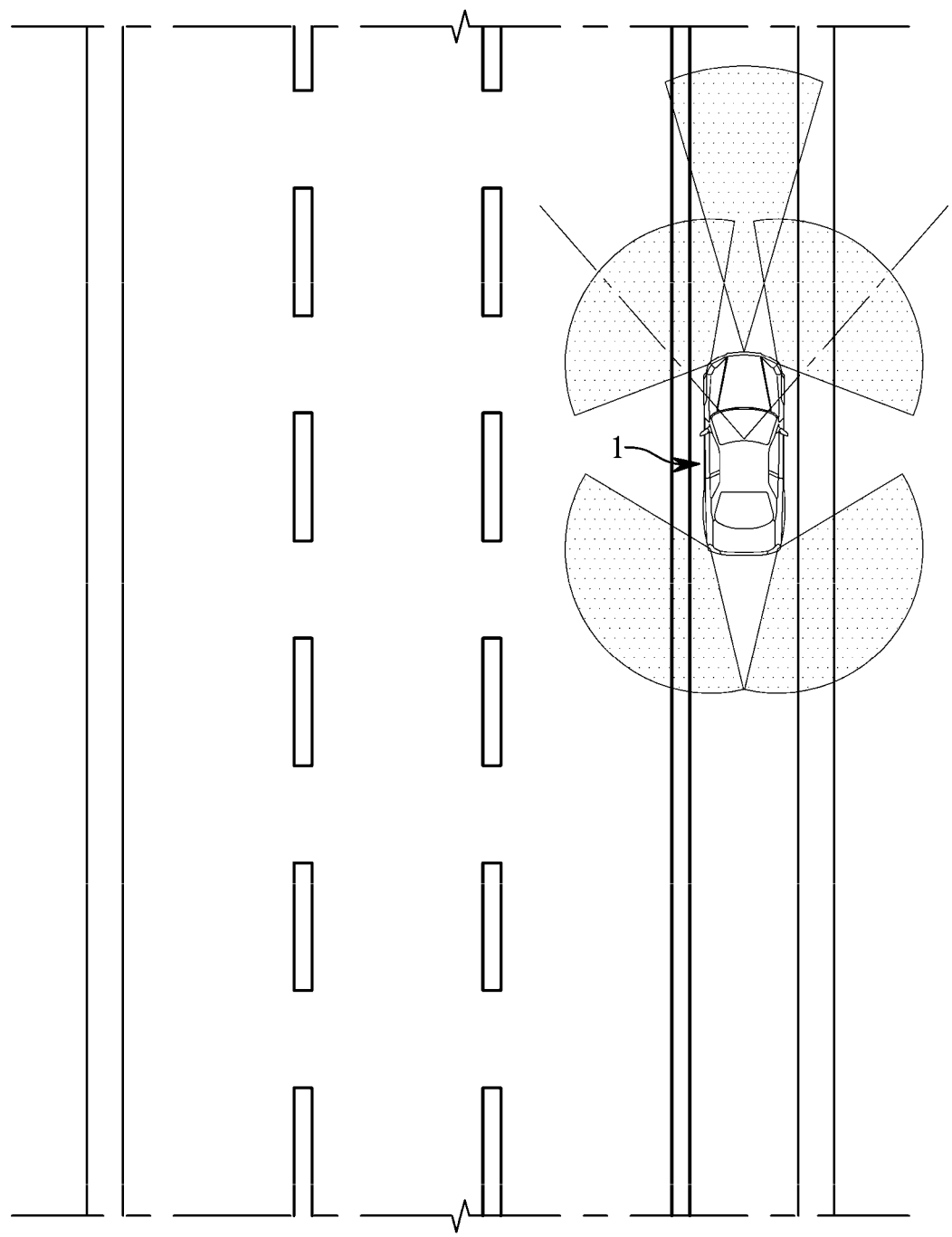

DRIVER ASSISTANT SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2020-0102537, filed on Aug. 14, 2020 in the Korean Intellectual Property Office, the disclosure of which is incorporated herein by reference.

BACKGROUND

1. Field

The disclosure relates to a driver assistant system, and more specifically, to a driver assistant system capable of autonomously stopping in a drowsy driving situation of a driver and a method of controlling the same.

2. Description of the Related Art

Fatal accident rates due to driver drowsiness on highways are increasing. In order to support autonomous driving on highways, a Highway Driving Assist (HAD) function has been installed in recently mass-produced vehicles, and an example of the HAD includes an advanced smart cruise control (ASCC) system that recognizes the distance to a preceding vehicle and a lane to allow the vehicle to maintain its own lane.

As described above, the vehicle may prevent drowsy driving on highways by applying sensors and systems installed in the vehicle, and stop on the shoulder of a highway in case of drowsy driving or an emergency so that fatal accidents are prevented.

SUMMARY

The present disclosure provides a driver assistant system capable of detecting drowsy driving and safely stopping a vehicle on the shoulder, and a method of controlling the same.

Additional aspects of the disclosure will be set forth in part in the description which follows and, in part, will be obvious from the description, or may be learned by practice of the disclosure.

According to an aspect of the disclosure, there is provided a driver assistance system including: an internal camera installed in a vehicle to detect whether a driver is in a drowsy driving, and configured to photograph a state of eyes of the driver to acquire drowsiness data; a first sensor installed in the vehicle to have a front-side view of the vehicle, and configured to acquire first sensor data to detect an object in the front-side view; a second sensor installed in the vehicle to have a rear-side view of the vehicle and configured to acquire second sensor data to detect an object in the rear-side view; and a controller including at least one processor configured to process the drowsiness data, the first sensor data, and the second sensor data, wherein the controller is configured to, if a result of processing the drowsiness data is that the driver has closed the driver's eyes for a predetermined time or longer, transmit a control signal to at least one of a braking device or a steering device to perform a lane change for stopping the vehicle based on a result of processing the first sensor data and the second sensor data.

The driver assistance system may further include a torque sensor configured to measure a steering torque caused by a steering manipulation of the driver, wherein the controller may be configured to, in response to having no change in the steering torque from the torque sensor, identify that the driver is in no contact with the steering wheel; and transmit the control signal to the at least one of the braking device or the steering device to perform the lane change for stopping the vehicle.

The driver assistance system may further include a contact detection sensor mounted on a steering wheel of the vehicle and configured to detect a change in capacitance caused by a contact of the driver with the steering wheel, and wherein the controller is configured to: in response to having no change in the capacitance from the contact detection sensor, identify that the driver is in no contact with the steering wheel; and transmit the control signal to the at least one of the braking device or the steering device to perform the lane change for stopping the vehicle.

The controller may be configured to: if the result of processing the drowsiness data is that the driver has closed the driver's eyes for the predetermined time or longer, generate a warning signal for waking the driver, and in response to having no change in the capacitance from the contact detection sensor after the generation of the warning signal, transmit the control signal to the at least one of the braking device or the steering device to perform the lane change for stopping the vehicle.

The controller may perform a lane change to a left side or a right side if no object is detected on the left side or the right side of the vehicle.

The controller may be configured to, if a lane on a left or right side of the vehicle is a shoulder lane, perform a lane change and then stop the vehicle.

The controller may be configured to, if a shoulder lane is absent on a left or right side of the vehicle, generate a warning signal for waking the driver.

The controller may be configured to, if a lane line adjacent to the left or right side of the vehicle is a solid line, identify that a lane on the left or right side of the vehicle is a shoulder lane.

The first sensor may include at least one of a charge-coupled device (CCD) camera or a light detection and ranging (LiDAR), and the second sensor includes a radar.

The first sensor may include a corner radar having the front-side view of the vehicle, and the controller may be configured to identify whether a fixed object exists on a left or right side of the vehicle through the corner radar, and if a distance between the fixed object and the vehicle is greater than or equal to a certain distance, identify that a shoulder lane exists.

According to another aspect of the disclosure, there is provided a method of controlling a driver assistance system, the method including: photographing a state of eyes of a driver to acquire drowsiness data, to detect whether the driver is in a drowsy driving; acquiring first sensor data to detect an object in a front-side view of the vehicle; acquiring second sensor data to detect an object in a rear-side view of the vehicle; processing the drowsiness data, the first sensor data, and the second sensor data; and if a result of processing the drowsiness data is that the driver has closed the driver's eyes for a predetermined time or longer, transmitting a control signal to at least one of a braking device or a steering device to perform a lane change for stopping the vehicle based on a result of processing the first sensor data and the second sensor data.

The method may further include measuring a steering torque caused by a steering manipulation of the driver, wherein the transmitting of the control signal may include: in response to having no change in the steering torque, identifying that the driver is in no contact with the steering wheel; and transmitting the control signal to the at least one of the braking device or the steering device to perform the lane change for stopping the vehicle.

The method may further include detecting a change in capacitance caused by a contact of the driver with the steering wheel, and wherein the transmitting of the control signal may include, in response to having no change in the capacitance, identifying that the driver is in no contact with the steering wheel; and transmitting the control signal to the at least one of the braking device or the steering device to perform the lane change for stopping the vehicle.

The transmitting of the control signal may include: if the result of processing the drowsiness data is that the driver has closed the driver's eyes for the predetermined time or longer, generating a warning signal for waking the driver; and in response to having no change in the capacitance from the contact detection sensor after the generating of the warning signal, transmitting the control signal to the at least one of the braking device or the steering device to perform the lane change for stopping the vehicle.

The transmitting of the control signal may include performing a lane change to a left side or a right side if no object is detected on the left side or the right side of the vehicle.

The transmitting of the control signal may include, if a lane on a left or right side of the vehicle is a shoulder lane, performing a lane change and then stop the vehicle.

The transmitting of the control signal may include, if a shoulder lane is absent on a left or right side of the vehicle, generating a warning signal for waking the driver. The transmitting of the control signal may include, if a lane line adjacent to the left or right side of the vehicle is a solid line, identifying that a lane on the left or right side of the vehicle is a shoulder lane.

The first sensor data may be acquired through at least one of a charge-coupled device (CCD) camera or a light detection and ranging (LiDAR), and the second sensor data may be acquired through a radar.

The first sensor data may be acquired through a corner radar having the front-side view of the vehicle, and the transmitting of the control signal may include identifying whether a fixed object exists on a left or right side of the vehicle through the corner radar, and if a distance between the fixed object and the vehicle is greater than or equal to a certain distance, identifying that a shoulder lane exists.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram illustrating a configuration of a vehicle according to an embodiment;

FIG. 2 is a control block diagram illustrating a driver assistant system according to an embodiment;

FIG. 3 is a view illustrating a camera and a radar included in a driver assistant system according to an embodiment;

FIGS. 4 to 6 are flowcharts of a method of controlling a vehicle according to an embodiment; and FIGS. 7 to 9 are diagrams for describing a lane change and a stopping of a vehicle according to an embodiment.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module","~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or longer other features, integers, steps, operations, elements, components, and/or groups thereof, unless the context clearly indicates otherwise.

In the specification, it will be understood that, when a member is referred to as being "on/under" another member, it may be directly on/under the other member, or one or longer intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

FIG. 1 is a block diagram illustrating a configuration of a vehicle according to an embodiment.

Referring to FIG. 1, the vehicle 1 includes an engine 10, a transmission 20, a braking device 30, and a steering device 40. The engine 10 may include a cylinder and a piston, and may generate power for driving the vehicle 1. The transmission 20 may include a plurality of gears and may transmit the power generated by the engine 10 to vehicle wheels. The braking device 30 may decelerate the vehicle 1 or stop the vehicle 1 through friction with the vehicle wheels. The steering device 40 may change the traveling direction of the vehicle 1.

The vehicle 1 may include a plurality of electronic components. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistant system (DAS) 100.

The EMS 11 may control the engine 10 in response to acceleration intent of a driver through an accelerator pedal or a request of the DAS 100100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal, and the like.

The DAS 100 may assist the driver in manipulating (driving, braking, steering) the vehicle 1. For example, the DAS 100 may detect an environment (e.g., another vehicle, a pedestrian, a cyclist, a lane, a road sign, etc.) around the vehicle 1 and control the driving and/or braking and/or steering of the vehicle 1 in response to the detected environment.

The DAS 100 may provide the driver with various functions. For example, the DAS 100 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The DAS 100 may include a camera module 101 for acquiring image data around the vehicle 1 and a radar module 102 for acquiring object data around the vehicle 1. The camera module 101 may include a camera 101a and an electronic control unit (ECU) 101b, and may capture an image of a front side of the vehicle 1 and recognize other vehicles, pedestrians, cyclists, lanes, road signs, and the like. The radar module 102 may include a radar 102a and an electronic control unit (ECU) 102b and may acquire relative positions and relative velocities of objects (e.g., other vehicles, pedestrians, cyclists, and the like) around the vehicle 1.

The DAS 100 includes a LiDAR module 103 that scans around the vehicle 1 and detects an object. The LiDAR module 103 may include a LiDAR 103a and an ECU 103b, and acquire relative positions, relative velocities, etc. of a moving object (e.g., other vehicles, pedestrians, cyclists, etc.) around the vehicle 1. In addition, the LiDAR module 103 may acquire the shape and location of a fixed object (e.g., a building, a sign, a traffic light, a bump, etc.) around the vehicle 1.

The above-described electronic components may communicate with each other through vehicle communication network (NT). For example, the electrical components may exchange data therebetween through Ethernet, media-oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively, through the NT.

FIG. 2 is a control block diagram illustrating a driver assistant system according to an embodiment. FIG. 3 is a view illustrating a camera and a radar included in a driver assistant system according to an embodiment.

Referring to FIG. 2, the vehicle 1 may include a braking system 32, a steering system 42, and a driver assistant system 100.

The braking system 32 includes an EBCM (31 in FIG. 1) and a braking device (30 in FIG. 1) described in conjunction with FIG. 1, and the steering system 42 includes an EPS (41 in FIG. 1) and a steering device (40 in FIG. 1).

The DAS 100 may include a front camera 110, a front radar 120, a plurality of corner radars 130, an internal camera 150, and a torque sensor 160.

The front camera 110 may have a field of view 110a directed to the front of the vehicle 1 as shown in FIG. 3. The front camera 110 may be installed, for example, on a front windshield of the vehicle 1.

The front camera 110 may photograph the front of the vehicle 1 and acquire image data regarding the front of the vehicle 1. The image data regarding the front of the vehicle 1 may include the position of an object, such as another vehicle, a pedestrian, a cyclist, or a lane located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 have a field of sensing 120a directed to the front of the vehicle 1 as shown in FIG. 3. The front radar 120 may be installed, for example, in a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may acquire front radar data from the transmission radio waves transmitted by the transmission antenna and the reflection radio waves received by the reception antenna. Front radar data may include distance information and velocity information regarding an object, such as another vehicle, a pedestrian, or a cyclist existing in front of the vehicle 1. The front radar 120 may calculate the relative distance to the object based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1 as shown in FIG. 3. The first corner radar 131 may be installed, for example, on the right side of a front bumper of the vehicle 1. The second corner radar 132 may have a field of sensing 132a directed to the front left side of the vehicle 1, and may be installed, for example, on the left side of the front bumper of the vehicle 1. The third corner radar 133 may have a field of sensing 133a directed to the rear right side of the vehicle 1 and may be installed, for example, on the right side of a rear bumper of the vehicle 1. The fourth corner radar 134 may have a field of sensing 134a directed to the rear left side of the vehicle 1 and may be installed, for example, on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian, a cyclist, (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1, respectively.

Each of the first, second, third, and fourth corner radars 131, 132, 133 and 134 may be connected to the controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The internal camera 150 may be installed in the vehicle 1 to detect whether the driver is in a drowsy driving. The internal camera 150 may be installed on a cluster (not shown) or a steering wheel (not shown) to photograph a state of the driver's eyes. However, the above-described position of the internal camera 150 is only an example, and the internal camera 150 may be located in any other position as long as it can capture the state of the drivers eyes.

The internal camera 150 may continuously or periodically photograph the state of the drivers eyes to acquire drowsiness data, and transmit the drowsiness data to the controller 140. The controller 140 may process the drowsiness data and identify that the driver is in a drowsy driving state if the driver has closed his/her eyes for a predetermined time or longer. For example, if the driver has closed his/her eyes for five seconds or longer, the controller 140 may identify that the driver is in a drowsy driving state.

The internal camera 150 may include a plurality of lenses and an image sensor. The image sensor may include a plurality of photodiodes for converting light into electrical signals, and the plurality of photodiodes may be arranged in a two-dimensional matrix. The internal camera 150 may be a CCD camera, and may include an infrared camera.

The internal camera 150 may be electrically connected to the controller 140.

For example, the internal camera 150 may be connected to the controller 140 through a vehicle communication network NT, through a hard wire, or through a printed circuit board (PCB).

The controller 140 may include the ECU (101b in FIG. 1) of the camera module (101 in FIG. 1) and/or the ECU (102b in FIG. 1) of the radar module (102 in FIG. 1), and/or an integrated ECU.

The torque sensor 160 is installed in a steering column (not shown) connected to the steering wheel, detects a steering torque of the steering column generated when the steering wheel is rotated, and outputs a torque value such that the output torque value is provided to the controller 140.

The torque sensor 160 may provide the controller 140 with the torque value representing a change in the steering torque to identify whether the driver is manipulating the steering wheel based on the change in the steering torque.

In addition to the torque sensor 160, the DAS 100 may include a contact detection sensor (not shown). The contact detection sensor may be installed on the steering wheel and provide the amount of change in capacitance to the controller 140 to identify whether the driver is in contact with the steering wheel.

The controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42. For example, the processor 141 may include an image processor for processing front image data of the front camera 110 and/or a digital signal processor for processing radar data of the radars 120 and 130 and/or a micro control unit (MCU) for generating a braking signal and a steering signal.

The processor 141 may receive drowsiness data for identifying a drowsy driving state of the driver from the internal camera 150. In addition, the processor 141 may receive first sensor data from a first sensor (not shown) to detect an object in a front-side view of the vehicle 1, and receive second sensor data from a second sensor (not shown) to detect an object in a rear-side view of the vehicle 1. Here, the first sensor may include at least one of a CCD camera or a LiDAR, and the second sensor may include at least one of the third corner radar 133 installed on the rear right side of the vehicle 1, and the fourth corner radar 134 installed on the rear left side of the vehicle 1.

The processor 141 processes the drowsiness data, and controls at least one of the braking device or the steering device to change lanes for stopping the vehicle 1 if the driver has closed his/her eyes for a predetermined time or longer. Details of the process will be described with reference to FIGS. 4 to 9.

The processor 141 may sense detects (e.g., another vehicle, a pedestrian, a cyclist, and the like) in front of the vehicle 1 based on the front image data of the front camera 110 and the front radar data of the front radar 120.

In detail, the processor 141 may acquire position (distance and direction) and relative velocity of the objects in front of the vehicle 1 based on the front radar data of the front radar 120. The processor 141 may acquire position (direction) and type information (for example, whether the object is another vehicle, a pedestrian, or a cyclist) of the objects in front of the vehicle 1 based on the front image data of the front camera 110. In addition, the processor 141 may allow the objects detected from the front image data to match with the objects detected from the front radar data, and acquire the type information, the position, and the relative velocity of the objects in front of the vehicle 1 based on a result of the matching.

The processor 141 may generate a braking signal and a steering signal based on the type information, the position, and the velocity information of the objects in front of the vehicle 1.

For example, the processor 141 calculates a time to collision (TTC) between the vehicle 1 and an object (hereinafter referred to as a front object) in front of the vehicle based on the position (distance) and the relative velocity of the front objects, and compares the TTC with a predetermined reference time to warn the driver of a collision or transmit a braking signal to the braking system 32. In response to the TTC being less than a predetermined first reference time, the processor 141 may allow an alert to be output via audio and/or display. In response to the TTC being less than a predetermined second reference time, the processor 141 may transmit a preliminary-braking signal to the braking system 32. In response to the TTC being less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative velocity of the front objects, and warn the driver of a collision or transmit a braking signal to the braking system 32 based on a result of comparing the DTC with distances to the front objects.

The processor 141 may acquire positions (distance and direction) and relative velocities of the objects on the sides of the vehicle 1 (front right, front left, rear right, and rear left) based on corner radar data of the plurality of corner radars 130.

The processor 141 may transmit a steering signal to the steering system 42 based on the position (distance and direction) and relative velocity of side objects of the vehicle 1.

For example, if a collision with a front object is predicted to occur based on a DTC or TTC, the processor 141 may transmit a steering signal to the steering system 42 to avoid the collision with the front object.

The processor 141 may identify whether to avoid a collision with a front object by changing the travelling direction of the vehicle 1 based on the positions (distance and direction) and relative velocities of the side objects of the vehicle 1. For example, if there is no object located on the side of the vehicle 1, the processor 141 may transmit a steering signal to the steering system 42 to avoid collision with a front object. If a collision with a side object is not predicted to occur after steering of the vehicle 1 based on the positions (distance and direction) and relative velocity of the side objects, the processor 141 may transmit a steering signal to the steering system 42 to avoid collision with a front object. If a collision with a side object is predicted to occur after steering of the vehicle 1 based on the positions (distance and direction) and relative velocities of the side objects, the processor 141 may not transmit a steering signal to the steering system 42.

The memory 142 stores programs and/or data for processing image data by the processor 141, programs and/or data for processing radar data by the processor 141, and programs and/or data for generating a braking signal, a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

The DAS 100 is not limited to that shown in FIG. 2, and may further include a LiDAR that scans around the vehicle 1 and detects an object.

As such, the controller 140 may transmit a braking signal to the braking system 32 based on whether a collision with a front object is predicted to occur. If a side object does not exist or a collision with a side object is not predicted to occur, the controller 140 may transmit a steering signal to the steering system 42 to avoid collision with the front object. If a collision with a side object is predicted to occur after steering, the controller 140 may not transmit a steering signal to the steering system 42.

Hereinafter, an embodiment of a DAS and a method of controlling the same according to an aspect will be described in detail with reference to the accompanying drawings.

FIGS. 4 to 6 are flowcharts of a method of controlling a vehicle according to an embodiment. However, this is only a preferred embodiment for achieving the object of the present disclosure, and some operations may be added or deleted as needed. FIGS. 7 to 9 are diagrams for describing a lane change and a stopping of a vehicle according to an embodiment.

The vehicle 1 acquires drowsiness data by photographing the driver's eye state (401).

When it is identified that the drivers eyes have been closed for a predetermined time or longer (402), the vehicle 1 may generate a warning signal for waking the driver (403). In this case, the warning signal may be output through an audio and/or a display, and may also be a haptic signal provided to the steering wheel.

After generating the warning signal or after confirming the driver's eye state, the vehicle 1 detects whether the driver's hand is in contact with the steering wheel (404). The detecting whether the driver's hand is in contact with the steering wheel is performed to finally identify whether the driver is in a drowsy driving state before the vehicle 1 stops on the shoulder, and corresponds to a process of confirming whether the driver is properly gripping the steering wheel through a torque sensor or a touch sensor as described above.

According to an embodiment, the controller 140 receives a torque value from the torque sensor, identifies that the driver is not in contact with the steering wheel if there is no change in the steering torque, and reconfirms to be the drowsy driving state. Through the reconfirmation, the controller 140 transmits a control signal to at least one of the braking device or the steering device so that the vehicle 1 performs a lane change for stopping on the shoulder.

According to an embodiment, the controller 140 receives a capacitance change value from the contact detection sensor, identifies that the driver is not in contact with the steering wheel if there is no change in capacitance, and reconfirms to be the drowsy driving state. Through the reconfirmation, the controller 140 transmits a control signal to at least one of the braking device or the steering device so that the vehicle 1 performs a lane change for stopping on the shoulder.

According to an embodiment, if a result of processing the drowsiness data is that the driver has closed his/her eyes for a predetermined time or longer, the controller 140 identifies that the driver is in a drowsy driving state, and receives sensor data from various sensors provided in the vehicle 1 to detect an object travelling on the right side of the vehicle 1. In this case, the controller 140 transmits a control signal to at least one of the braking device or the steering device so that the vehicle 1 performs a lane change for stopping on the shoulder.

In addition, according to an embodiment, if a result of processing the drowsiness data is that the driver has closed his/her eyes for a predetermined time or longer, the controller 140 may generate a warning signal for waking the driver. In this case, the controller 140 checks whether the driver is awakened by the warning signal through the torque sensor or the contact detection sensor. For example, the controller 140 may check whether the driver has come in contact with the steering wheel through at least one of the torque sensor or the contact detection sensor. If a contact of the driver with the steering wheel is not detected despite the warning signal, the controller 140 transmits a control signal to at least one of the braking device or the steering device so that the vehicle 1 performs a lane change for stopping.

When a contact of the driver's hand with the steering wheel is not detected (405), the vehicle 1 controls to acquire sensor data for lane change and stopping (406).

Referring to FIG. 5, when the state of the driver's drowsy driving is confirmed, the vehicle 1 detects an object travelling on the left or right side of the vehicle 1 for changing lanes or stopping on the shoulder (501). In general, the vehicle 1 detects an object driving on the right side to stop on the shoulder. This applies to a case in which the road is a left-hand drive (LHD) road, and a country following a right-hand drive (RHD) may detect an object driving on the left. Hereinafter, embodiments will be described based on a LHD method.

The vehicle 1 performs a lane change to reach the shoulder, and checks whether an object having a risk of collision travels in a lane to which the vehicle 1 is planning to move. Referring to FIG. 7, when the vehicle 1 detects objects 2-1 and 2-2 on the right lane, the vehicle 1 does not change lanes, but accelerates or decelerates such that the objects become distant by a certain distance or more.

In addition, the vehicle 1 may acquire image data through the front camera to identify whether the shoulder exists on the right side of the road. In this case, when it is identified that the shoulder exists on the right side, the vehicle 1 may perform a lane change to reach the shoulder.

If the vehicle 1 does not detect an object on the right lane, the vehicle 1 performs a lane change into right lane (503).

Meanwhile, each of the operations according to FIG. 5 shows a case in which the vehicle 1 is not adjacent to the shoulder. Accordingly, when the vehicle 1 is travelling adjacent to the shoulder, the operations according to FIG. 5 may be omitted, and the vehicle 1 checks whether there is a space on the right side for the vehicle 1 to stop, and if there is an enough space, the vehicle 1 may enter the shoulder without changing lanes and perform stop.

Referring to FIG. 6, the vehicle 1 detects a shoulder on the right side of the vehicle 1 (601). The vehicle 1 may identify that a lane adjacent to the vehicle 1 on the right side is a shoulder when a lane line of the lane is a solid line. In addition, the vehicle 1 may identify whether there is a fixed object on the right side through the corner radar, and if the distance between the fixed object and the vehicle 1 is greater than or equal to a certain distance, the vehicle 1 may identify that a shoulder exists.

For example, referring to FIG. 8, the vehicle 1 may measure the distance (i.e., a length of D1) between the vehicle 1 and the fixed object. In addition, the vehicle 1 may measure the distance (i.e., a length of D2) between the vehicle 1 and a right-side lane line adjacent to the vehicle 1. In this case, the vehicle 1 calculates the difference between the lengths D1 and D2, and if a value of D1-D2 is equal to or greater than the full width of the vehicle 1, the vehicle 1 identifies the existence of a shoulder on which the vehicle 1 may stop.

If there is no shoulder on the right side of the vehicle 1, the vehicle 1 may re-generate a warning signal for waking the driver.

When a shoulder is found (602), the vehicle 1 performs a lane change for stopping in the shoulder lane (603). The vehicle 1 controls the steering device to perform a lane change.

Referring to FIG. 9, if the vehicle 1 enters the shoulder, the vehicle 1 controls the brake system to perform stop (604).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the driver assistant system and the method of controlling the same can prevent fatal accidents by safely stopping a vehicle on the shoulder in drowsy driving or emergency situations.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A driver assistance system comprising:
   an internal camera installed in a vehicle to detect whether a driver is in a drowsy driving, and configured to photograph a state of eyes of the driver to acquire drowsiness data;
   a first sensor installed in the vehicle to have a front-side view of the vehicle, and configured to acquire first sensor data to detect an object in the front-side view;

a second sensor installed in the vehicle to have a rear-side view of the vehicle and configured to acquire second sensor data to detect an object in the rear-side view; and a controller including at least one processor configured to process the drowsiness data, the first sensor data, and the second sensor data, wherein the controller is configured to:
if a result of processing the drowsiness data is that the driver has closed the driver's eyes for a predetermined time or longer, transmit a control signal to at least one of a braking device or a steering device to perform a lane change for stopping the vehicle based on a result of processing the first sensor data and the second sensor data, and if a shoulder lane is absent on a left side or a right side of the vehicle, generate a warning signal for waking the driver.

2. The driver assistance system of claim 1, further comprising a torque sensor configured to measure a steering torque caused by a steering manipulation of the driver,
wherein the controller is configured to:
in response to having no change in the steering torque from the torque sensor, identify that the driver is in no contact with the steering wheel; and transmit the control signal to the at least one of the braking device or the steering device to perform the lane change for stopping the vehicle.

3. The driver assistance system of claim 2, wherein the controller is configured to:
if the result of processing the drowsiness data is that the driver has closed the driver's eyes for the predetermined time or longer, generate a warning signal for waking the driver, and
in response to having no change in the capacitance from the contact detection sensor after the generation of the warning signal, transmit the control signal to the at least one of the braking device or the steering device to perform the lane change for stopping the vehicle.

4. The driver assistance system of claim 1, further comprising a contact detection sensor mounted on a steering wheel of the vehicle and configured to detect a change in capacitance caused by a contact of the driver with the steering wheel, and
wherein the controller is configured to:
in response to having no change in the capacitance from the contact detection sensor, identify that the driver is in no contact with the steering wheel; and transmit the control signal to the at least one of the braking device or the steering device to perform the lane change for stopping the vehicle.

5. The driver assistance system of claim 1, wherein the controller performs a lane change to the left side or the right side if no object is detected on the left side or the right side of the vehicle.

6. The driver assistance system of claim 1, wherein the controller is configured to, if a lane on the left side or the right side of the vehicle is a shoulder lane, perform a lane change and then stop the vehicle.

7. The driver assistance system of claim 6, wherein the controller is configured to, if a lane line adjacent to the left or right side of the vehicle is a solid line, identify that a lane on the left or right side of the vehicle is a shoulder lane.

8. The driver assistance system of claim 1, wherein the first sensor includes at least one of a charge-coupled device (CCD) camera or a light detection and ranging (LiDAR), and the second sensor includes a radar.

9. The driver assistance system of claim 1, wherein the first sensor includes a corner radar having the front-side view of the vehicle, and
the controller is configured to:
identify whether a fixed object exists on the left side or the right side of the vehicle through the corner radar, and if a distance between the fixed object and the vehicle is greater than or equal to a certain distance, identify that a shoulder lane exists.

10. A method of controlling a driver assistance system, the method comprising:
photographing a state of eyes of a driver to acquire drowsiness data, to detect whether the driver is in a drowsy driving;
acquiring first sensor data to detect an object in a front-side view of a vehicle;
acquiring second sensor data to detect an object in a rear-side view of the vehicle;
processing the drowsiness data, the first sensor data, and the second sensor data; and
if a result of processing the drowsiness data is that the driver has closed the driver's eyes for a predetermined time or longer, transmitting a control signal to at least one of a braking device or a steering device to perform a lane change for stopping the vehicle based on a result of processing the first sensor data and the second sensor data,
wherein the transmitting of the control signal includes, if a shoulder lane is absent on a left side or a right side of the vehicle, generate a warning signal for waking the driver.

11. The method of claim 10, further measuring a steering torque caused by a steering manipulation of the driver,
wherein the transmitting of the control signal includes:
in response to having no change in the steering torque, identifying that the driver is in no contact with the steering wheel; and transmitting the control signal to the at least one of the braking device or the steering device to perform the lane change for stopping the vehicle.

12. The method of claim 11, wherein the transmitting of the control signal includes:
if the result of processing the drowsiness data is that the driver has closed the driver's eyes for the predetermined time or longer, generating a warning signal for waking the driver; and
in response to having no change in the capacitance from the contact detection sensor after the generating of the warning signal, transmitting the control signal to the at least one of the braking device or the steering device to perform the lane change for stopping the vehicle.

13. The method of claim 10, further comprising detecting a change in capacitance caused by a contact of the driver with the steering wheel, and
wherein the transmitting of the control signal includes:
in response to having no change in the capacitance, identifying that the driver is in no contact with the steering wheel, and transmitting the control signal to the at least one of the braking device or the steering device to perform the lane change for stopping the vehicle.

14. The method of claim 10, wherein the transmitting of the control signal includes
performing a lane change to the left side or the right side if no object is detected on the left side or the right side of the vehicle.

15. The method of claim 10, wherein the transmitting of the control signal includes, if a lane on the left side or the right side of the vehicle is a shoulder lane, performing a lane change and then stop the vehicle.

16. The method of claim 15, wherein the transmitting of the control signal includes, if a lane line adjacent to the left side or the right side of the vehicle is a solid line, identifying that a lane on the left side or the right side of the vehicle is a shoulder lane.

17. The method of claim 10, wherein the first sensor data is acquired through at least one of a charge-coupled device (CCD) camera or a light detection and ranging (LiDAR), and the second sensor data is acquired through a radar.

18. The method of claim 10, wherein the first sensor data is acquired through a corner radar having the front-side view of the vehicle, and
 the transmitting of the control signal includes:
  identifying whether a fixed object exists on the left side or the right side of the vehicle through the corner radar, and if a distance between the fixed object and the vehicle is greater than or equal to a certain distance, identifying that a shoulder lane exists.

* * * * *